(12) United States Patent
Watanabe et al.

(10) Patent No.: US 11,811,048 B2
(45) Date of Patent: Nov. 7, 2023

(54) NON-AQUEOUS ELECTROLYTE SOLUTION BATTERY AND COMMUNICATION DEVICE

(71) Applicant: MURATA MANUFACTURING CO., LTD., Kyoto (JP)

(72) Inventors: Kohei Watanabe, Kyoto (JP); Jun Yagisawa, Kyoto (JP); Miho Suzuki, Kyoto (JP); Kaoru Yabuki, Kyoto (JP); Koji Harada, Kyoto (JP); Yushin Endo, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 664 days.

(21) Appl. No.: 16/803,516

(22) Filed: Feb. 27, 2020

(65) Prior Publication Data
US 2020/0203709 A1 Jun. 25, 2020

Related U.S. Application Data

(63) Continuation of application No. PCT/JP2018/031588, filed on Aug. 27, 2018.

(30) Foreign Application Priority Data

Aug. 28, 2017 (JP) .................... 2017-163033

(51) Int. Cl.
*H01M 4/131* (2010.01)
*H01M 10/0525* (2010.01)
(Continued)

(52) U.S. Cl.
CPC ........... *H01M 4/131* (2013.01); *H01M 4/623* (2013.01); *H01M 4/806* (2013.01);
(Continued)

(58) Field of Classification Search
CPC ............ H01M 4/131; H01M 10/0427; H01M 10/0525; H01M 10/056; H01M 10/425
See application file for complete search history.

(56) References Cited

U.S. PATENT DOCUMENTS 4,687,716 A * 8/1987 Nagaura ................. H01M 6/16
429/231.95
5,443,930 A * 8/1995 Shoji ..................... H01M 4/133
429/232
(Continued)

FOREIGN PATENT DOCUMENTS

JP 55-069960 A 5/1980
JP 57-158962 A 9/1982
(Continued)

OTHER PUBLICATIONS

Wang et al., b-MnO2 as a cathode material for lithium ion batteries from first principles calculations, Phys. Chem. Chem. Phys., 2013, 15, 9075 (Year: 2013).*

(Continued)

*Primary Examiner* — Jonathan G Jelsma
(74) *Attorney, Agent, or Firm* — K&L Gates LLP

(57) ABSTRACT

A non-aqueous electrolyte solution battery includes a positive electrode containing manganese dioxide and a carbon material; a negative electrode including one of lithium and a lithium alloy; a non-aqueous electrolyte solution; and a container configured to accommodate the positive electrode, the negative electrode, and the non-aqueous electrolyte solution. In a spectrum that is measured by performing Raman spectroscopic analysis with respect to the positive electrode by using argon laser at a wavelength of 514.5 nm, an average value of peak intensity ratios $I_D/I_G$ of an intensity $I_D$ of a peak appearing in the vicinity of 1330 $cm^{-1}$ to an (Continued)

intensity $I_G$ of a peak appearing in the vicinity of 1580 cm$^{-1}$ satisfies a relationship of $0.5 \leq I_D/I_G \leq 1.3$.

16 Claims, 4 Drawing Sheets

(51) Int. Cl.
    *H01M 10/42*      (2006.01)
    *H01M 10/056*      (2010.01)
    *H01M 4/62*      (2006.01)
    *H01M 4/80*      (2006.01)
    *H01M 50/489*      (2021.01)
    *H01M 50/119*      (2021.01)
    *H01M 50/167*      (2021.01)

(52) U.S. Cl.
    CPC ..... *H01M 10/056* (2013.01); *H01M 10/0525* (2013.01); *H01M 10/425* (2013.01); *H01M 50/119* (2021.01); *H01M 50/167* (2021.01); *H01M 50/489* (2021.01); *H01M 2010/4278* (2013.01)

(56) References Cited

U.S. PATENT DOCUMENTS

| | | | | |
|---|---|---|---|---|
| 5,591,545 A | * | 1/1997 | Miyashita | C04B 35/524 423/445 R |
| 6,277,520 B1 | * | 8/2001 | Moutsios | H01M 4/50 429/162 |
| 2014/0377608 A1 | * | 12/2014 | Uzuka | H01M 6/06 423/605 |

FOREIGN PATENT DOCUMENTS

| | | | | |
|---|---|---|---|---|
| JP | H01-239761 A | | 9/1989 | |
| JP | H04-034859 A | | 2/1992 | |
| JP | 10-112308 | * | 4/1998 | ............ H01M 4/06 |
| JP | 2001-216975 A | | 8/2001 | |
| JP | 2003-249213 A | | 9/2003 | |
| JP | 2005-085569 | | 3/2005 | |
| JP | 2008-103109 A | | 5/2005 | |
| JP | 2008-103109 | * | 5/2008 | ............ H01M 6/16 |
| JP | 2010-114206 A | | 5/2010 | |
| JP | 2011-249216 | | 12/2011 | |
| JP | 2012-169223 A | | 9/2012 | |

OTHER PUBLICATIONS

JP 2008-103109 machine translation (Year: 2008).*
JP 10-112308 machine translation (Year: 1998).*
International Search Report issued in connection with PCT/JP2018/031588, dated Sep. 25, 2018. (2 pages).
Michio, Inagaki. & Feiyu Kang. Material Science and Engineering of Carbon: Characterization, (2016) Chapter 2, p. 20.

* cited by examiner

NON-AQUEOUS ELECTROLYTE SOLUTION BATTERY AND COMMUNICATION DEVICE

CROSS REFERENCE TO RELATED APPLICATIONS

The present application is a continuation of PCT patent application no. PCT/JP2018/031588, filed on Aug. 27, 2018, which claims priority to Japanese patent application no. JP2017-163033 filed on Aug. 28, 2017, the entire contents of which are being incorporated herein by reference.

BACKGROUND

The present disclosure generally relates to a non-aqueous electrolyte solution battery and a communication device provided with the non-aqueous electrolyte solution battery.

A flat non-aqueous electrolyte solution primary battery in which manganese dioxide is used in a positive electrode, one of a lithium metal and a lithium alloy is used in a negative electrode, and a non-aqueous electrolyte solution is used in an electrolyte solution has been used in a main power source for memory backup and the like since it is possible to maintain stable characteristics for a long period of time. In addition, recently, a communication technology referred to as a low power wide area (LPWA) in which a transmission distance reaches up to 10 kilometers is in widespread use. It is considered that the flat non-aqueous electrolyte solution battery is applied to a communication device performing LPWA communication. According to such an application, it is expected that stable characteristics are obtained for a long period of time, and thus, reliability of device life is improved.

Examples of the communication device in which the LPWA communication is performed include a smart meter. Currently, the smart meter is in widespread use around the world. In addition, recently, the LPWA communication technology is not limited to the smart meter, but the LPWA communication technology has begun to be applied to an environment sensor such as a water level sensor and a water temperature sensor for agriculture, and has been introduced in Japan. As described above, an LPWA communication device is assumed to be used in various applications in the future, and the widespread use thereof is considered to expand.

However, in such an LPWA communication device, pulse discharge characteristics reaching up to several tens of mA in a current region are required. The flat non-aqueous electrolyte solution primary battery of the related art has excellent reliability, but has a standard discharge current of less than 1 mA, and thus, a voltage drop is large at the time of pulse discharge, and it is difficult to satisfy the characteristics described above. Therefore, in order to suppress the voltage drop at the time of the discharge, an attempt for improvement that is focused on solid-state electron conductivity of a positive electrode pellet has been made. For example, a technology has been considered in which carbon materials having different $I_D/I_G$ that is a Raman spectrum intensity ratio are used, and thus, the crystallinity of the carbon material is controlled, and electron conductivity is improved.

Most of the carbon material except for the surface is configured of the graphite, and thus, the proportion of the graphite is excessively large, it is difficult for the electrolyte solution to be infiltrated into the pellet, and a passing route for a lithium ion (an electrolyte solution path) is insufficient at the time of the discharge. For this reason, in a case where the battery is used in the LPWA communication device, the passing route for a lithium ion dominates the voltage drop at the time of the pulse discharge. Therefore, it is difficult to obtain sufficient pulse discharge characteristics.

In addition, a carbon material having a graphitization degree of 0.6 to 0.8 is effective in the improvement of the discharge characteristics, but there is also a problem with the use of the carbon material having such a graphitization degree, in the flat non-aqueous electrolyte solution battery. Examples of a specific candidate include the artificial graphite in which the crystallinity is decreased compared to the natural graphite, the pyrolytic carbon, and the like, as a realistic candidate, but all of the candidates are a material sorted into the graphite, and have high aggregability, the passing route for a lithium ion is insufficient, and it is difficult to obtain sufficient pulse discharge characteristics.

In the technology of the related art, the crystallinity of the carbon material is improved, and the heavy load characteristics are improved, but the composition of the carbon material is mostly the graphite, and thus, the passing route for a lithium ion is insufficient, and diffusion resistance increases. As a result thereof, the discharge characteristics greatly decrease at the time of the pulse discharge in the order of several tens of mA, and thus, it is difficult to apply the flat non-aqueous electrolyte solution battery to the LPWA communication device.

An object of the present disclosure is to provide a non-aqueous electrolyte solution battery in which pulse discharge characteristics in the order of several tens of mA can be improved, and a communication device provided with the non-aqueous electrolyte solution battery.

According to an embodiment of the present disclosure, a non-aqueous electrolyte solution battery includes: a positive electrode including manganese dioxide and a carbon material; a negative electrode including one of lithium and a lithium alloy; a non-aqueous electrolyte solution; and a container configured to accommodate the positive electrode, the negative electrode, and the non-aqueous electrolyte solution, in which in a spectrum that is measured by performing Raman spectroscopic analysis with respect to the positive electrode by using argon laser at a wavelength of 514.5 nm, an average value of peak intensity ratios $I_D/I_G$ of an intensity $I_D$ of a peak appearing in the vicinity of 1330 $cm^{-1}$ to an intensity $I_G$ of a peak appearing in the vicinity of 1580 $cm^{-1}$ satisfies a relationship of $0.5 \leq I_D/I_G \leq 1.3$, and a mass ratio $M_2/M_1$ of a mass $M_1$ of the positive electrode to a mass $M_2$ of the non-aqueous electrolyte solution satisfies a relationship of $0.22 \leq M_2/M_1$.

According to an embodiment of the present disclosure, a communication device includes: the non-aqueous electrolyte solution battery as described herein.

According to the present disclosure, it is possible to improve pulse discharge characteristics in the order of several tens of mA. Note that, the effects described here are not necessarily limited, and may be one of effects described in the present disclosure and effects other than the described effects.

BRIEF DESCRIPTION OF FIGURES

SUMMARY

The present disclosure generally relates to a non-aqueous electrolyte solution battery and a communication device provided with the non-aqueous electrolyte solution battery.

Figure 1:
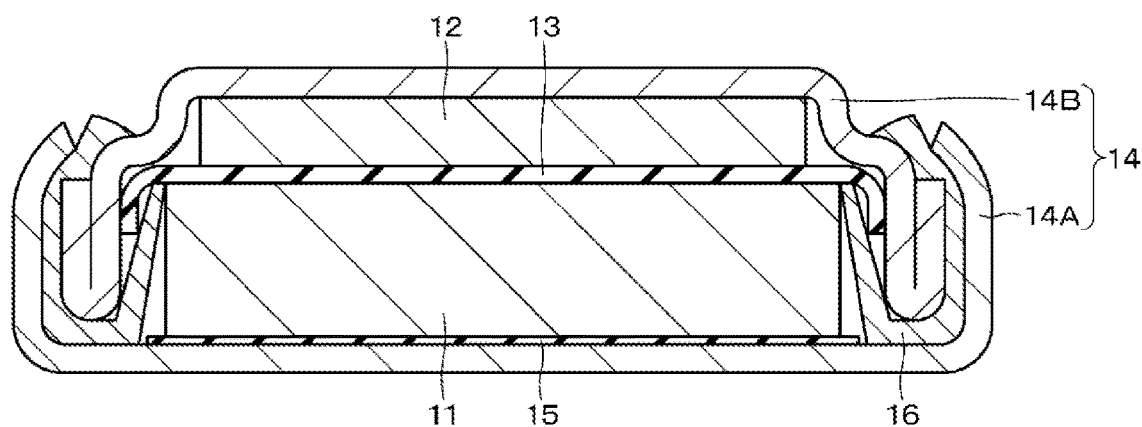

FIG. 1 is a sectional view illustrating an example of a configuration of a battery according to an embodiment of the present disclosure.

Figure 2A:
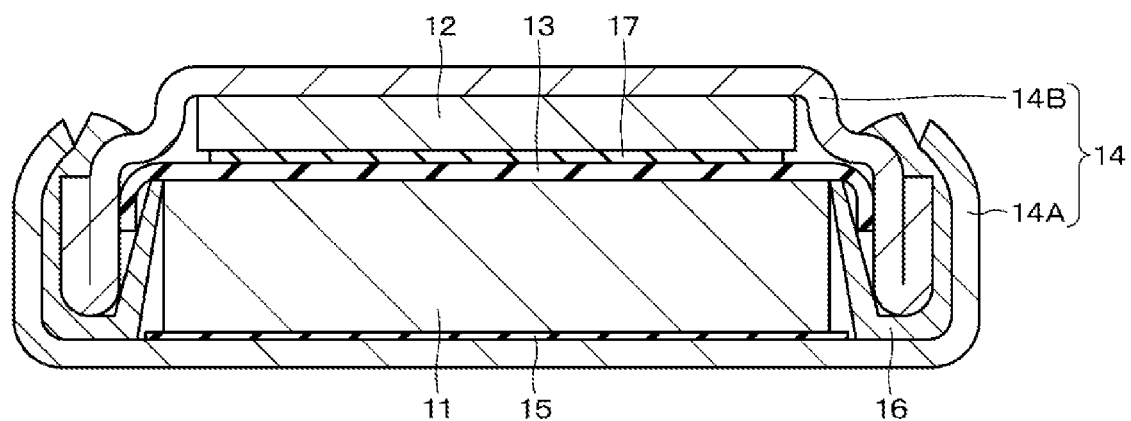
Figure 2B:
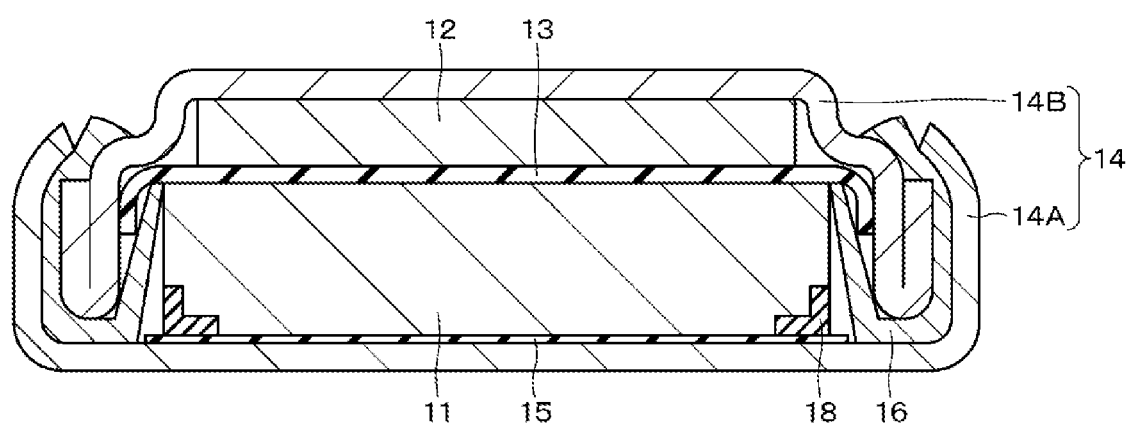

FIG. 2A is a sectional view illustrating an example of a configuration of a battery according to Modification Example 1 of an embodiment of the present disclosure. FIG. 2B is a sectional view illustrating an example of a configuration of a battery according to Modification Example 2 of an embodiment of the present disclosure.

Figure 3:
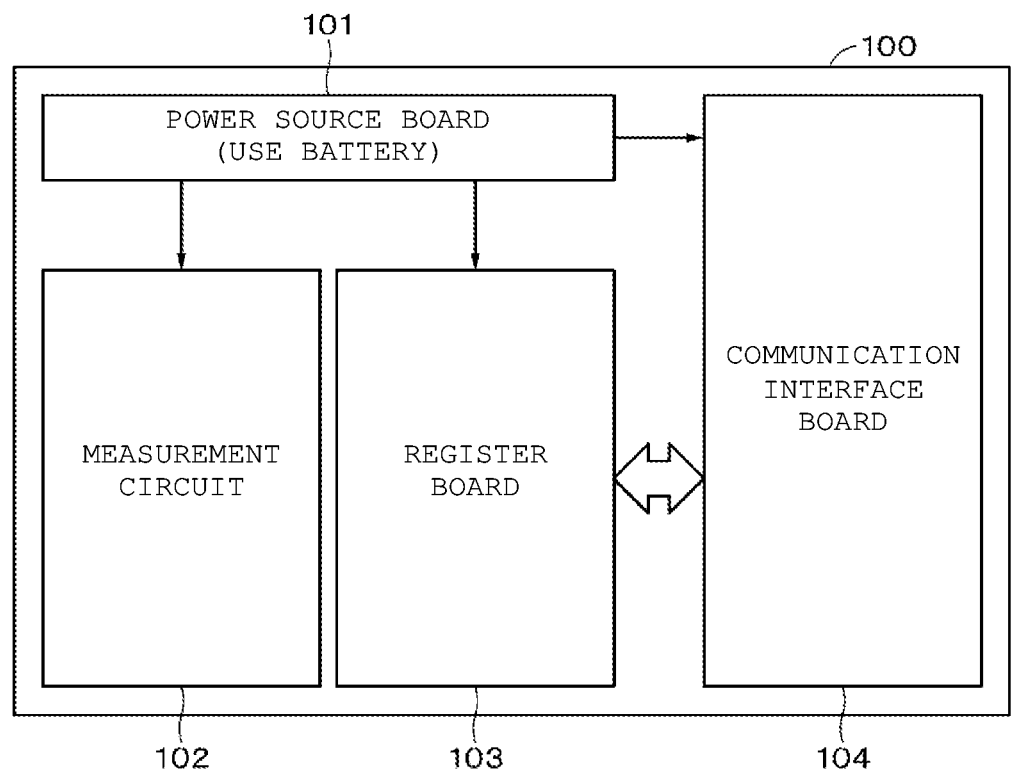

FIG. 3 is a block diagram illustrating an example of a configuration of a smart meter according to an embodiment of the present disclosure.

Figure 4:
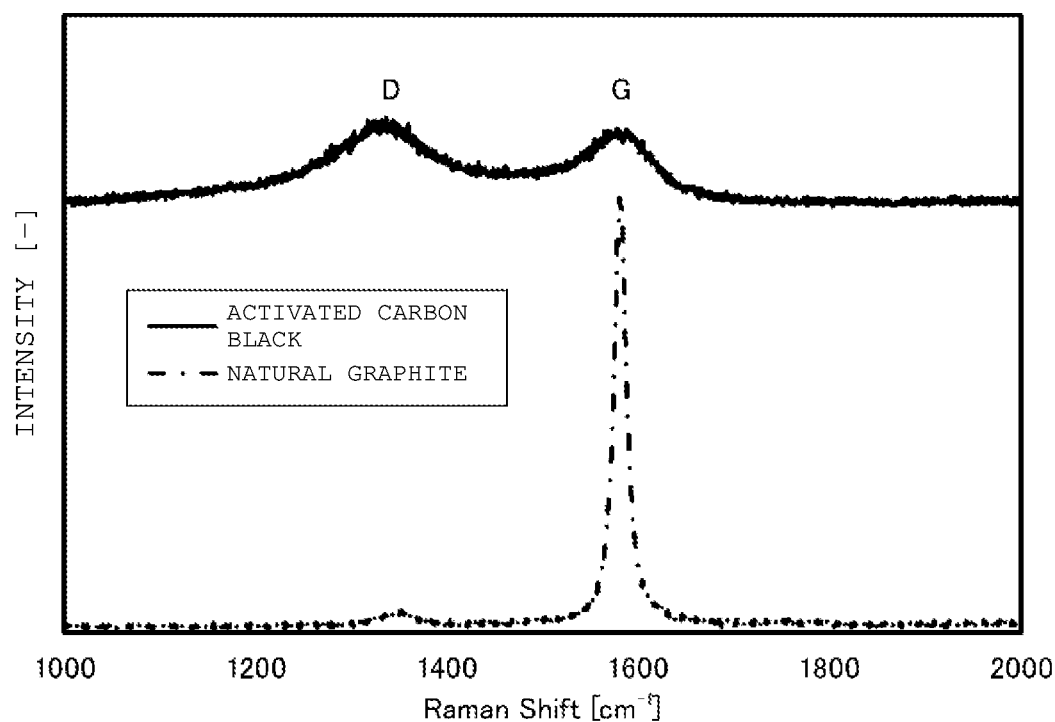

FIG. 4 is a diagram illustrating Raman spectrums of positive electrode pellets 1 and 4 according to an embodiment of the present disclosure.

Figure 5:
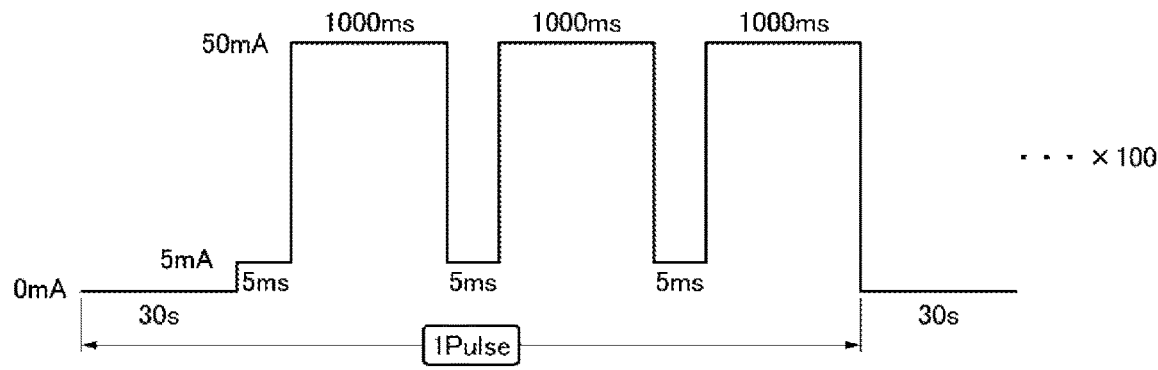

FIG. 5 is a diagram illustrating a pulse discharge profile assuming an LPWA communication device according to an embodiment of the present disclosure.

Figure 6:
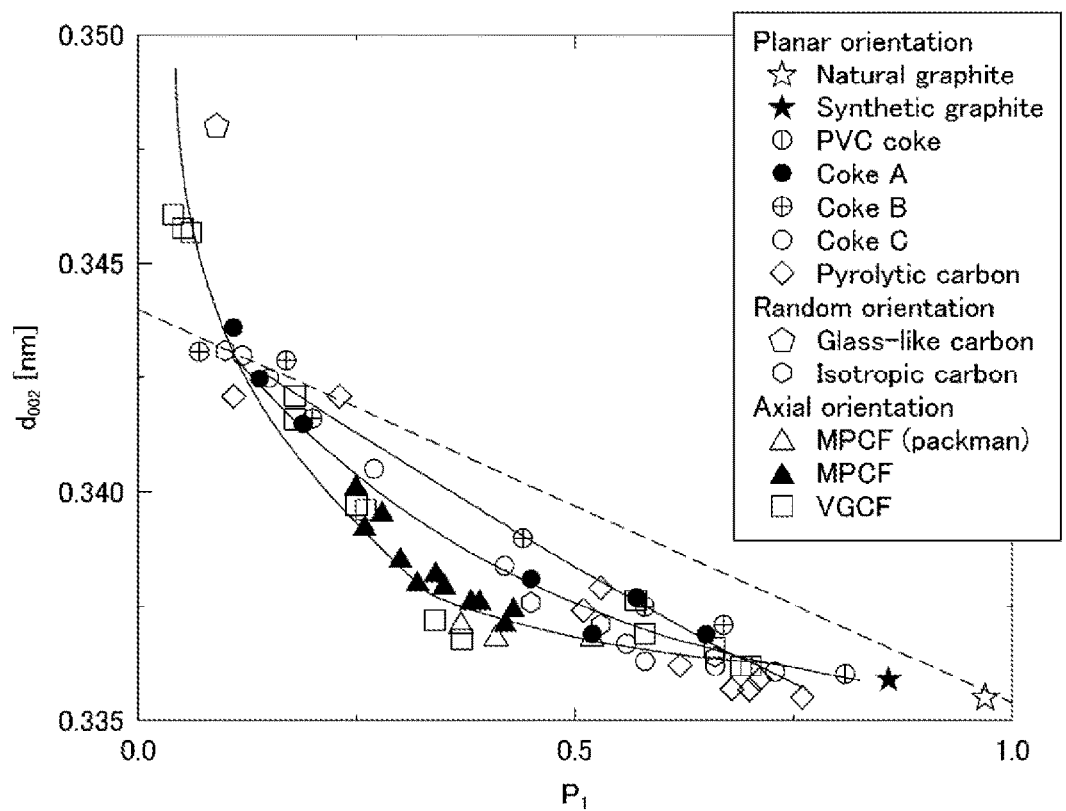

FIG. 6 is a diagram illustrating a mutual relationship between a graphitization degree P1 and an average surface separation d002 for various carbon materials according to an embodiment of the present disclosure.

DETAILED DESCRIPTION

As described herein, the present disclosure will be described based on examples with reference to the drawings, but the present disclosure is not to be considered limited to the examples, and various numerical values and materials in the examples are considered by way of example.

First, an example of the configuration of a battery according to one embodiment of the present disclosure will be described.

FIG. 1 illustrates an example of the configuration of the battery according to one embodiment of the present disclosure. The battery according to one embodiment of the present disclosure is a so-called flat non-aqueous electrolyte solution battery (also referred to as one of a button-like non-aqueous electrolyte solution battery and a coin-like non-aqueous electrolyte solution battery), and includes a disk-like positive electrode 11, a disk-like negative electrode 12, a separator 13, a non-aqueous electrolyte solution (not illustrated), and a button-like container 14 containing the constituents described above.

The container 14 includes a positive electrode can 14A and a negative electrode cup 14B, and a containing space for containing the positive electrode 11, the negative electrode 12, the separator 13, and the non-aqueous electrolyte solution is formed by combining the positive electrode can 14A and the negative electrode cup 14B. The positive electrode can 14A includes a circular bottom portion, and a sidewall portion that is erected towards the upper side from a peripheral edge of a bottom portion. A conductive layer 15 is provided on an inner surface of the bottom portion of the positive electrode can 14A. The negative electrode cup 14B includes a circular head portion, and a sidewall portion that is erected towards the lower side from a peripheral edge of the head portion, and a tip end portion of the sidewall portion is folded back to the outside of the sidewall portion.

The positive electrode 11 is contained in the positive electrode can 14A, and the negative electrode 12 is contained in the negative electrode cup 14B. The positive electrode 11 contained in the positive electrode can 14A and the negative electrode 12 contained in the negative electrode cup 14B face each other with the separator 13 interposed therebetween. The positive electrode can 14A and the negative electrode cup 14B are filled with the non-aqueous electrolyte solution that is a liquid electrolyte, and peripheral edge portions of the positive electrode can 14A and the negative electrode cup 14B are sealed by being crimped with a gasket 16 interposed therebetween.

The positive electrode 11 contains manganese dioxide as a positive electrode active material, and a carbon material as a conductive agent. In a spectrum that is measured by performing Raman spectroscopic analysis with respect to the positive electrode 11 by using argon laser at a wavelength of 514.5 nm, the carbon material satisfies the following relationships. That is, an average value of peak intensity ratios $I_D/I_G$ of an intensity $I_D$ of a peak appearing in the vicinity of 1330 cm$^{-1}$ (a D band) and an intensity $I_G$ of a peak appearing in the vicinity of 1580 cm$^{-1}$ (a G band) satisfies a relationship of $0.5 \leq I_D/I_G \leq 1.3$. In a case where the average value of the peak intensity ratios $I_D/I_G$ satisfies the relationship described above, a graphitization degree of the carbon material is low, and thus, a path of a lithium ion in the positive electrode 11 increases, and pulse discharge characteristics in the order of several tens of mA can be improved.

The carbon material in which the average value of the peak intensity ratios $I_D/I_G$ satisfies the relationship described above, for example, is one of single activated carbon black, and a mixture of activated carbon black and natural graphite. The activated carbon black is carbon black in which a heat treatment reaction (one of $C+H_2O \rightarrow CO+H_2$ and $C+CO_2 \rightarrow 2CO$) is performed by using a precursor of carbon black at a temperature of higher than or equal to 900° C. in one of water vapor and carbon dioxide, and has many voids and a large specific surface area. The average value of $I_D/I_G$ of the activated carbon black depends on a temperature at the time of an activation reaction, but the activated carbon black is carbon black in which the average value of $I_D/I_G$ is approximately 1.0 to 1.5. In a case where the activated carbon black is mixed with the natural graphite, $I_D/I_G$ decreases in accordance with a mixed amount, and thus, it is preferable that the carbon material is synthesized by being mixed with the natural graphite such that $0.5 \leq I_D/I_G \leq 1.3$ is obtained, and is used in the positive electrode 11.

For example, at least one type of various $MnO_2$ having different crystals can be used as the manganese dioxide. More specifically, at least one type of $\alpha$-$MnO_2$, $\beta$-$MnO_2$, $\gamma$-$MnO_2$, and the like can be used, and it is preferable to use $\beta$-$MnO_2$ from the viewpoint of load characteristics. However, the manganese dioxide is not limited to the materials described above.

It is preferable that a mass ratio of the manganese dioxide to the carbon material (Manganese Dioxide:Carbon Material) is 90:10 to 97:3. In a case where the mass ratio of the manganese dioxide is greater than or equal to 90, the amount of positive electrode active material in the positive electrode 11 is a particularly sufficient amount, and thus, it is possible to suppress a decrease in a battery capacity. On the other hand, in a case where the mass ratio of the manganese dioxide is less than or equal to 97, the amount of carbon material in the positive electrode 11 is a particularly sufficient amount, and thus, it is possible to particularly improve the pulse discharge characteristics in the order of several tens of mA.

It should be understood that, herein, in a numerical range represented by using "to", numerical values described before and after "to" are respectively included as the minimum value and the maximum value.

It is preferable that the positive electrode 11 further contains a binding agent from the viewpoint of molding properties. The type of binding agent is not particularly limited, but it is preferable that the binding agent includes a fluorine-based resin, from the viewpoint of improving the molding properties, and in particular, it is preferable that the binding agent includes at least one type of polytetrafluoroethylene (PTFE) and polyvinylidene fluoride (PVdF).

The content of the fluorine-based resin in the positive electrode 11 is greater than or equal to 1.4 mass % and less than 10 mass %. In a case where the content of the fluorine-based resin is greater than or equal to 1.4 mass %, it is possible to ensure an excellent mechanical strength of the positive electrode 11. On the other hand, in a case where the content of the fluorine-based resin is less than 10 mass %, it is possible to suppress a decrease in a discharge capacity.

A mass ratio $M_2/M_1$ of a mass $M_1$ of the positive electrode 11 to a mass $M_2$ of the non-aqueous electrolyte solution satisfies a relationship of $0.22 \leq M_2/M_1$, and preferably satisfies a relationship of $0.22 \leq M_2/M_1 \leq 0.40$.

The carbon material in which the average value of the peak intensity ratios $I_D/I_G$ satisfies the relationship described above has a large absorption amount of the electrolyte solution. However, in a case where the mass ratio $M_2/M_1$ is less than 0.22, the amount of non-aqueous electrolyte solution with respect to the positive electrode 11 is excessively small, and thus, absorption unevenness of the electrolyte solution occurs in the carbon material. For this reason, there is a concern that it is not possible to improve the pulse discharge characteristics in the order of several tens of mA. In a case where the mass ratio $M_2/M_1$ is greater than 0.40, the amount of non-aqueous electrolyte solution with respect to the positive electrode 11 is excessively large, and thus, there is a concern that the electrolyte solution overflows in a production line, and the maximum overall height of the battery increases and does not satisfy a dimensional standard.

It is preferable that an outer diameter ratio $D_2/D_1$ of an outer diameter $D_2$ of the positive electrode 11 when an open circuit voltage (OCV) is 3.2 V to an outer diameter $D_1$ of the battery satisfies a relationship of $0.8 \leq D_2/D_1$, and it is more preferable that the outer diameter ratio $D_2/D_1$ satisfies a relationship of $0.8 \leq D_2/D_1 \leq 0.9$. In a case where the outer diameter ratio $D_2/D_1$ satisfies the relationship of $0.8 \leq D_2/D_1$, it is possible to particularly improve the pulse discharge characteristics in the order of several tens of mA. On the other hand, in a case where the outer diameter ratio $D_2/D_1$ satisfies the relationship of $D_2/D_1 \leq 0.9$, it is possible to sufficiently ensure a gap between a battery member and the positive electrode 11, and to prevent the expansion of the positive electrode 11 from being hindered by the battery member at the time of discharge.

The negative electrode 12 contains one of a lithium metal and a lithium alloy. The lithium alloy may include at least one type of aluminum, tin, silicon, and nickel, as a metal additive substance.

The non-aqueous electrolyte solution contains a non-aqueous solvent (an organic solvent) and an electrolyte salt. For example, one of a high-boiling solvent, a low-boiling solvent, and a mixture of the high-boiling solvent and the low-boiling solvent can be used as the non-aqueous solvent. In particular, it is preferable that cyclic carbonate is used as the high-boiling solvent, and an ether compound is used as the low-viscosity solvent, from the viewpoint of an electroconductivity. For example, at least one type of ethylene carbonate, propylene carbonate, butylene carbonate, and vinylene carbonate can be used as the cyclic carbonate. For example, at least one type of 1,2-dimethoxy ethane (monoglyme), diglyme, triglyme, tetraglyme, methoxy ethoxy ethane, 1,2-diethoxy ethane, tetrahydrofuran, γ-butyl lactone, and 1,3-dioxolan can be used as the ether compound. It is preferable that the propylene carbonate and the 1,2-dimethoxy ethane are used as the non-aqueous solvent, from the viewpoint of load characteristics and an operation temperature range. It is preferable that a mass ratio of the propylene carbonate to the 1,2-dimethoxy ethane (Propylene carbonate:1,2-Dimethoxy ethane) is 1:1 to 3:1. In a case where the mass ratio of the propylene carbonate to the 1,2-dimethoxy ethane is in the range described above, it is possible to particularly improve the pulse discharge characteristics in the order of several tens of mA.

Examples of the electrolyte salt that is a solute include lower lithium carboxylate, lithium halide, lithium nitrate, lithium perchlorate, lithium hexafluorophosphate, lithium borofluoride, lithium chloroborane, fluorine-containing alkyl sulfonyl imide lithium, lithium hexafluoroarsenate, lithium hexafluoroantimonate, lithium 4-phenylborate, lithium bisoxalatoborate, $LiC_nF_{2n+1}SO_3$ (n≥1), and the like, one type of the electrolyte salts may be used, and two or more types thereof may be used by being mixed. In particular, it is preferable that the electrolyte salt includes at least the lithium perchlorate, from the viewpoint of the cost, the conductivity, and long-term reliability.

It is preferable that the content of the lithium perchlorate in the non-aqueous electrolyte solution is greater than or equal to 4 mass % and less than or equal to 10 mass %. In a case where the content of the electrolyte salt is greater than or equal to 4 mass %, it is possible to particularly improve the pulse discharge characteristics in the order of several tens of mA. On the other hand, in a case where the content of the electrolyte salt is less than or equal to 10 mass %, it is possible to suppress a decrease in low-temperature characteristics of the battery. It is preferable that the content of the lithium perchlorate in the non-aqueous electrolyte solution is greater than or equal to 4 mass % and less than or equal to 7 mass %, in consideration of the balance of low-temperature discharge characteristics.

For example, one of a porous film, a non-woven fabric, and the like can be used as the separator 13, and the non-woven fabric is preferable from the viewpoint of suppressing an internal short circuit. For example, at least one type of resin of polyethylene, polypropylene, a methyl pentene polymer, polybutylene terephthalate, and polyphenylene sulfide can be used as the material of the separator 13. However, the structure and the material of the separator 13 are not particularly limited to the above description. In order to improve liquid absorptivity of the separator 13, a surfactant and the like may be applied onto the surface of the separator 13.

One of polypropylene, polybutylene terephthalate, and polyphenylene sulfide is preferable as the gasket 16, from the viewpoint of sealing characteristics, but the material of the gasket 16 is not particularly limited thereto.

Each of the positive electrode can 14A and the negative electrode cup 14B, for example, contains a metal such as one of stainless steel and aluminum. The positive electrode can 14A functions as a current collector of the positive electrode 11, and the negative electrode cup 14B functions as a current collector of the negative electrode 12.

The positive electrode can 14A functions as the current collector of the positive electrode 11. The material of the positive electrode can 14A is not particularly limited, but stainless steel such as SUS316, SUS430, and SUS444 can be used as the material, and the surface of the positive electrode can may be subjected to plating and the like.

The negative electrode cup 14B functions as the current collector of the negative electrode 12. The material of the negative electrode cup 14B is not particularly limited, but one of iron and stainless steel such as SUS316, SUS430, and SUS444 can be used as the material, and the surface of the negative electrode cup may be subjected to plating and the like.

The conductive layer 15 is provided between the positive electrode 11 and the bottom portion of the positive electrode can 14A.

The conductive layer 15 is provided as described above, and thus, it is possible to particularly improve the pulse discharge characteristics in the order of several tens of mA. It is preferable that the conductive layer 15 is approximately in the shape of a circle. The conductive layer 15 contains a powder of a conductive grain. The conductive grain is not particularly limited, and one of a carbon grain, a metal grain such as a silver grain, and the like can be used as the conductive grain. Note that, in this embodiment, a case where the battery includes the conductive layer 15 is described, but the battery may not include the conductive layer 15.

The conductive layer 15 may be formed by applying a conductive coating material onto an inner surface of the bottom portion of the positive electrode can 14A. One of a carbon paste and a silver paste is preferable as the conductive coating material.

It is preferable that an area ratio $S_1/S_2$ of an area $S_1$ in which the conductive layer 15 is in contact with a bottom surface of the positive electrode 11 to a bottom area $S_2$ of the positive electrode 11 satisfies a relationship of $0.72 \leq S_1/S_2$. In a case where the area ratio $S_1/S_2$ satisfies the relationship of $0.72 \leq S_1/S_2$, it is possible to particularly improve the pulse discharge characteristics in the order of several tens of mA.

Next, an example of the manufacturing method of the battery according to one embodiment of the present disclosure will be described.

First, the disk-like negative electrode 12 is contained in the negative electrode cup 14B. Next, the manganese dioxide as the positive electrode active material, the carbon material as the conductive agent, the binding agent, and a solvent such as water are mixed, and are subjected to a heating treatment, and the solvent is dried by evaporation, and thus, the disk-like positive electrode 11 is produced. Next, the conductive coating material is applied onto the inner surface of the bottom portion of the positive electrode can 14A, and the approximately circular conductive layer 15 is formed, and then, the positive electrode 11 is contained in the positive electrode can 14A.

Next, the gasket 16 is disposed in the peripheral edge portion of the negative electrode 12, and the non-aqueous electrolyte solution is injected into the negative electrode cup 14B, and then, the negative electrode 12 and the positive electrode 11 are disposed to face each other with the separator 13 interposed therebetween, and the positive electrode can 14A and the negative electrode cup 14B are sealed by being crimped with the gasket 16 interposed therebetween. As described above, a desired battery is obtained.

The battery according to one embodiment includes the positive electrode 11, the negative electrode 12, the separator 13, the non-aqueous electrolyte solution, and the button-like container 14 containing the constituents described above. In the spectrum that is measured by performing the Raman spectroscopic analysis with respect to the positive electrode 11 by using the argon laser at a wavelength of 514.5 nm, the average value of the peak intensity ratios $I_D/I_G$ of the intensity $I_D$ of the peak appearing in the vicinity of 1330 cm$^{-1}$ to the intensity $I_G$ of the peak appearing in the vicinity of 1580 cm$^{-1}$ satisfies the relationship of $0.5 \leq I_D/I_G \leq 1.3$. In addition, the mass ratio $M_2/M_1$ of the mass $M_2$ of the non-aqueous electrolyte solution to the mass $M_1$ of the positive electrode 11 satisfies the relationship of $0.22 \leq M_2/M_1$. Accordingly, it is possible to improve the pulse discharge characteristics in the order of several tens of mA. In addition, the positive electrode 11 contains the carbon material having a high average value of the peak intensity ratios $I_D/I_G$ ($0.5 \leq I_D/I_G \leq 1.3$), as the conductive agent, and thus, it is possible to improve the conductivity of the positive electrode 11.

Modification Example 1

As illustrated in FIG. 2A, the negative electrode 12 includes a facing surface that faces the positive electrode 11, and a fine powder layer 17 formed of a fine powder containing a lithium-aluminum alloy is further provided on the facing surface. In the case of adopting such a configuration, it is possible to improve pulse characteristics at a low temperature. The fine powder layer 17 is formed by pasting an aluminum foil to the facing surface described above.

Modification Example 2

As illustrated in FIG. 2B, a ring member 18 containing the bottom surface side of the positive electrode 11 may be further provided, and the inner surface of the bottom portion of the positive electrode can 14A and the ring member 18 may be welded. In the case of adopting such a configuration, it is possible to suppress a decrease in an internal contact (an electrical contact between the positive electrode can 14A and the positive electrode 11) at the time of discharging the battery, and to suppress a decrease in a current collection effect. Note that, in this modification example, a configuration is described in which the conductive layer 15 is provided between the bottom portion of the positive electrode can 14A and the positive electrode 11, but the conductive layer 15 may not be provided.

The ring member 18, for example, contains a metal such as stainless steel. The ring member 18, for example, is a ring having an L-shaped sectional surface, and specifically, includes an annular peripheral wall portion that is closely in contact with a peripheral surface of the positive electrode 11, and a protruding portion that protrudes towards a central direction of the peripheral wall portion from a lower end of an inner surface of the peripheral wall portion, and the protruding portion is welded to the inner surface of the bottom portion of the positive electrode can 14A. The bottom surface of the positive electrode 11 is in contact with the conductive layer 15 with a hole portion of the ring member 18 interposed therebetween. The ring member 18 may be sunk into the positive electrode 11.

It is preferable that a peripheral edge of the conductive layer 15 is positioned in one of a position between the bottom portion of the positive electrode can 14A and the ring member 18 and a position outside the ring member 18. However, the peripheral edge of the conductive layer 15 may be positioned inside the ring member 18.

FIG. 3 illustrates an example of the configuration of a smart meter 100. The smart meter 100 is an example of an LPWA communication device, and includes a power source board 101, a measurement circuit 102, a register board 103, and a communication interface board 104.

The power source board 101 includes the battery according to one of one embodiment described above and the modification examples thereof, and supplies power to the measurement circuit 102, the register board 103, and the communication interface board 104. The measurement circuit 102 digitally measures the power consumption.

The register board 103 includes a microcontroller, a memory, and the like, and executes software for performing charge setting and the like, a security algorithm, and the like. Therefore, in the smart meter 100 of this application example, various functions that are difficult to be attained in an analog type smart meter of the related art can be incorporated.

The communication interface board 104 transmits information such as the power consumption to one of a power company and a relay apparatus thereof, and a base station by an LPWA communication method.

In the smart meter 100 of this application example, communication is performed by the communication interface board 104, and thus, it is possible to attain the automation of the examination of the power consumption, unlike the analog type smart meter of the related art.

As described above, the smart meter 100 includes the battery according to one of one embodiment described above and the modification examples thereof, in the power source board 101, and thus, it is possible to improve discharge characteristics of the smart meter 100 to which the LPWA communication method is adopted.

EXAMPLES

Hereinafter, the present disclosure will be described in more detail by examples, but the present disclosure is not limited to the examples.

The examples will be described in the following order.

i. Positive electrode pellet containing different carbon materials as conductive agent
ii. Examples and comparative examples in which peak intensity ratio $I_D/I_G$ and mass ratio $M_2/M_1$ are changed
iii. Example in which aluminum foil is pasted to lithium surface
iv. Examples in which outer diameter ratio $D_2/D_1$ of outer diameter $D_2$ of positive electrode pellet to outer diameter $D_1$ of battery is changed
v. Examples in which area ratio $S_1/S_2$ of contact area $S_1$ of conductive layer to bottom area $S_2$ of positive electrode pellet is changed First, β-MnO$_2$ (a positive electrode active material), natural graphite (a conductive agent), and PTFE (a binding agent) were mixed, and thus, a positive electrode mix was produced. Note that, the β-MnO$_2$ and the natural graphite were mixed at a mass ratio of β-MnO$_2$:Natural Graphite=95:5. Next, a positive electrode pellet was produced by using the positive electrode mix.

A positive electrode pellet 2 was produced as with the positive electrode pellet 1, except that artificial graphite was used as the conductive agent.

Activated carbon black and artificial graphite were mixed at a mass ratio of activated carbon black:artificial graphite=1:1, and thus, a mixture was obtained. A positive electrode pellet 3 was produced as with the positive electrode pellet 1 except that the mixture was used as the conductive agent.

A positive electrode pellet 4 was produced as with the positive electrode pellet 1, except that activated carbon black was used as the conductive agent.

First, the positive electrode pellet was subjected to Raman spectroscopic analysis by using argon laser at a wavelength of 514.5 nm. Specifically, the Raman spectroscopic analysis was performed at 20,000 points in a visual field of 200 μm×100 μm by taking points for each 1 μm focused on the center portion of the positive electrode pellet. FIG. 4 illustrates Raman spectrums of the positive electrode pellets 1 and 4. Next, a scattering spectrum intensity $I_D$ of a peak appearing in the vicinity of 1330 cm$^{-1}$ and a scattering spectrum intensity $I_G$ of a peak appearing in the vicinity of 1580 cm$^{-1}$ were obtained from analysis results at each of the points, and peak intensity ratios $I_D/I_G$ at 20,000 points were calculated. Subsequently, the calculated peak intensity ratios $I_D/I_G$ at 20,000 points were simply averaged (arithmetically averaged), and thus, an average value of peak intensity ratios $I_D/I_G$ was obtained.

Table 1 shows evaluation results of the average values of the peak intensity ratios $I_D/I_G$ of the positive electrode pellets 1 to 4.

TABLE 1

| Positive electrode pellet | Conductive agent | Average value of $I_D/I_G$ |
|---|---|---|
| 1 | Natural graphite | 0.003 |
| 2 | Artificial graphite | 0.3 |
| 3 | Mixture of activated carbon black and artificial graphite (mixed at mass ratio of 1:1) | 0.5 |
| 4 | Activated carbon black | 1.3 |

From Table 1, it is found that the average value of the peak intensity ratios $I_D/I_G$ is different in accordance with the type of carbon material that is the conductive agent, and the average value of the peak intensity ratios $I_D/I_G$ of each of the natural graphite, and the artificial graphite is less than 0.5, whereas the average value of the peak intensity ratios $I_D/I_G$ of each of the mixture of the activated carbon black and the natural graphite, and the activated carbon black is greater than or equal to 0.5.

<ii. Examples and Comparative Examples in which Peak Intensity Ratio $I_D/I_G$ and Mass Ratio $M_2/M_1$ are Changed>

Example 1

Lithium was pasted to a negative electrode cup in which an SUS430 material was subjected to nickel plating, while being subjected to press molding, and the thickness of a lithium metal was adjusted to 0.84 mm, and a diameter was adjusted to 16.5 mm.

Propylene carbonate (PC) and 1,2-dimethoxy ethane (DME) were mixed at a mass ratio of PC:DME=2:1, a mixed solvent was prepared, and then, lithium perchlorate was dissolved in the mixed solvent, and thus, a non-aqueous electrolyte solution was prepared. At this time, the added amount of the lithium perchlorate was adjusted such that the lithium perchlorate in the non-aqueous electrolyte solution was 7 mass %.

First, a separator having a thickness of 190 μm was disposed on the lithium on the negative electrode cup, and the cup and the separator were covered with a gasket from the upper side, and thus, a half cell was produced. The electrolyte solution was dropped onto the separator side of the produced half cell, and then, the positive electrode pellet was disposed, and thus, liquid absorption was performed again. Note that, the positive electrode pellet 3 was used as the positive electrode pellet. In addition, a ratio $M_2/M_1$ of a mass $M_2$ of the non-aqueous electrolyte solution to a mass $M_1$ of the positive electrode pellet was set to 0.351.

After that, a positive electrode can was covered with the half cell, and a flat non-aqueous electrolyte solution battery (hereinafter, simply referred to as a "battery") was produced by using a crimper. Note that, as the positive electrode can, an inner surface of a bottom portion was coated with a conductive coating material, and a circular conductive layer was formed. In addition, an outer diameter (a diameter) of the battery was adjusted to 20 mm, and a thickness was adjusted to 3.2 mm.

Example 2

The positive electrode pellet 4 was used as the positive electrode pellet. The mass ratio $M_2/M_1$ of the mass $M_2$ of the non-aqueous electrolyte solution to the mass $M_1$ of the positive electrode pellet was set to 0.394. Otherwise a battery was obtained as with Example 1.

Examples 3 to 5 and Comparative Example 6

Batteries were obtained as with Example 2, except that the mass ratio $M_2/M_1$ of the mass $M_2$ of the non-aqueous electrolyte solution to the mass $M_1$ of the positive electrode pellet was set to 0.220, 0.230, 0.400, and 0.201.

Examples 6 to 8

Mixed solvents were used in which PC and DME were mixed at mass ratios of PC:DME=1:1, 1:2, and 3:1. In addition, the mass ratio $M_2/M_1$ of the mass $M_2$ of the non-aqueous electrolyte solution to the mass $M_1$ of the positive electrode pellet was set to 0.332. Otherwise batteries were obtained as with Example 2.

Examples 9 and 10

A mixed solvent was used in which PC and DME were mixed at a mass ratio of PC:DME=2:1. In addition, the added amount of the lithium perchlorate was adjusted such that the lithium perchlorate in the non-aqueous electrolyte solution was 4 mass % and 10 mass %. Otherwise batteries were obtained as with Example 6.

Examples 11 to 13

Positive electrode pellets were produced as with the positive electrode pellet 1, except that the β-MnO$_2$ and the activated carbon black were mixed at mass ratios of β-MnO$_2$:activated carbon black=90:10, 96:4, and 97:3. Batteries were obtained as with Example 5, except that the positive electrode pellets produced as described above were used.

Comparative Example 1

The positive electrode pellet 1 was used as the positive electrode pellet. The conductive layer was not formed between the inner surface of the bottom portion of the positive electrode can and the positive electrode pellet. The ratio $M_2/M_1$ of the mass $M_2$ of the non-aqueous electrolyte solution to the mass $M_1$ of the positive electrode pellet was set to 0.201. Otherwise a battery was obtained as with Example 1.

Comparative Example 2

A battery was obtained as with Comparative Example 1, except that the conductive layer was formed between the inner surface of the bottom portion of the positive electrode can and the positive electrode pellet.

Comparative Example 3

The positive electrode pellet 2 was used as the positive electrode pellet. The ratio $M_2/M_1$ of the mass $M_2$ of the non-aqueous electrolyte solution to the mass $M_1$ of the positive electrode pellet was set to 0.204. Otherwise a battery was obtained as with Comparative Example 2.

Comparative Examples 4 and 5

The ratio $M_2/M_1$ of the mass $M_2$ of the non-aqueous electrolyte solution to the mass $M_1$ of the positive electrode pellet was set to 0.252 and 0.333. Otherwise a battery was obtained as with Comparative Example 2.

It should be understood that, in Examples 1 to 13 and Comparative Examples 1 to 6 described above, an outer diameter ratio $D_2/D_1$ of an outer diameter $D_2$ of the positive electrode pellet when OCV was 3.2 V to an outer diameter $D_1$ of the battery was fixed to 0.8. In addition, in Examples 1 to 13 and Comparative Examples 2 to 6 described above, an area ratio $S_1/S_2$ of an area $S_1$ in which the conductive layer was in contact with the bottom portion of the positive electrode pellet to a bottom area $S_2$ of the positive electrode pellet was fixed to 1.

First, pulse discharge illustrated in FIG. 5 was performed in an environment of 23° C., and thus, a pulse discharge capacity X (mAh) was obtained. Next, a discharge capacity (a theoretical value) Y (mAh) was obtained from the amount of positive electrode active material contained in the positive electrode pellet (the mass (g) of manganese dioxide), setting a theoretical capacity of manganese dioxide (MnO$_2$) to 260 mAh/g. Subsequently, a discharge utilization rate (%) was obtained by the following expression.

Discharge utilization rate (%)=$X/Y \times 100$(%)

Table 2 shows the configurations of the batteries of Examples 1 to 13 and Comparative Examples 1 to 6, and evaluation results.

TABLE 2

| | Positive electrode | | Presence | Electrolyte solution | | | Discharge utilization rate (%) |
|---|---|---|---|---|---|---|---|
| | MnO$_2$:Carbon material (mass ratio) | Average value of $I_D/I_G$ of carbon material | or absence of conductive layer | PC:DME (mass ratio) | LiClO$_4$ (mass %) | Mass ratio $M_2/M_1$ | |
| Example 1 | 95:5 | 0.5 | Present | 2:1 | 7 | 0.351 | 45.0 |
| Example 2 | 95:5 | 1.3 | Present | 2:1 | 7 | 0.394 | 60.0 |
| Example 3 | 95:5 | 1.3 | Present | 2:1 | 7 | 0.220 | 53.2 |
| Example 4 | 95:5 | 1.3 | Present | 2:1 | 7 | 0.230 | 59.9 |
| Example 5 | 95:5 | 1.3 | Present | 2:1 | 7 | 0.400 | 61.3 |
| Example 6 | 95:5 | 1.3 | Present | 1:1 | 7 | 0.332 | 50.9 |
| Example 7 | 95:5 | 1.3 | Present | 1:2 | 7 | 0.332 | 35.7 |
| Example 8 | 95:5 | 1.3 | Present | 3:1 | 7 | 0.332 | 50.5 |

TABLE 2-continued

| | Positive electrode | | Presence | Electrolyte solution | | | Discharge utilization rate (%) |
|---|---|---|---|---|---|---|---|
| | MnO$_2$:Carbon material (mass ratio) | Average value of I$_D$/I$_G$ of carbon material | or absence of conductive layer | PC:DME (mass ratio) | LiClO$_4$ (mass %) | Mass ratio M$_2$/M$_1$ | |
| Example 9 | 95:5 | 1.3 | Present | 2:1 | 4 | 0.332 | 51.5 |
| Example 10 | 95:5 | 1.3 | Present | 2:1 | 10 | 0.332 | 60.9 |
| Example 11 | 90:10 | 1.3 | Present | 2:1 | 7 | 0.400 | 60.5 |
| Example 12 | 96:4 | 1.3 | Present | 2:1 | 7 | 0.400 | 61.1 |
| Example 13 | 97:3 | 1.3 | Present | 2:1 | 7 | 0.400 | 44.7 |
| Comparative Example 1 | 95:5 | 0.003 | Absent | 2:1 | 7 | 0.201 | 0.0 |
| Comparative Example 2 | 95:5 | 0.003 | Present | 2:1 | 7 | 0.201 | 30.0 |
| Comparative Example 3 | 95:5 | 0.3 | Present | 2:1 | 7 | 0.204 | 30.3 |
| Comparative Example 4 | 95:5 | 0.003 | Present | 2:1 | 7 | 0.252 | 29.7 |
| Comparative Example 5 | 95:5 | 0.003 | Present | 2:1 | 7 | 0.333 | 30.8 |
| Comparative Example 6 | 95:5 | 1.3 | Present | 2:1 | 7 | 0.201 | 1.0 |

The followings are found from the evaluation results of Examples 1 and 2 (the batteries using the carbon materials in which the average values of I$_D$/I$_G$ are 0.5 and 1.3). In the case of using the carbon material in which the average value of I$_D$/I$_G$ is greater than or equal to 0.5, an excellent discharge utilization rate can be obtained. It is considered that this is because the carbon material in which the average value of I$_D$/I$_G$ is greater than or equal to 0.5 has a low graphitization degree, and thus, a path (a passage) of a lithium ion in the positive electrode pellet increases, and the discharge utilization rate is improved.

It should be understood that, in the carbon black, a regular crystalline structure that is seen as graphite decreases, as the average value of I$_D$/I$_G$ increases, and a turbostratic structure grows up. There is a tendency that carbon black with the turbostratic structure that grows up as described above has poor crystallinity, and a true density of a powder decreases, and thus, aggregability decreases. In a case where the positive electrode pellet is produced by using the carbon black having aggregability that decreases as described above, there is a concern that the density of the positive electrode pellet decreases, and a positive electrode capacity per a pellet volume decreases. Therefore, in consideration of a balance between the improvement of the discharge utilization rate and a decrease in the capacity, it is considered that it is preferable that the average value of I$_D$/I$_G$ is less than or equal to 1.3. Note that, the material in which the average value of I$_D$/I$_G$ is greater than 1.3 includes diamond, diamond-like carbon, graphene, graphene oxide, and the like, but all of the materials have insufficient conductivity and liquid retaining properties, and are not suitable for the present invention.

The followings are found from the evaluation results of Examples 3 to 5 and Comparative Example 6 (the battery using the carbon material in which the average value of I$_D$/I$_G$ is 1.3, in which the mass ratio M$_2$/M$_1$ of the mass M$_2$ of the non-aqueous electrolyte solution to the mass M$_1$ of the positive electrode pellet is changed). That is, in the Comparative Example 6 in which M$_2$/M$_1$ is 0.201, the discharge utilization rate considerably decreases. On the other hand, in Examples 3 to 5 in which M$_2$/M$_1$ is set to be greater than or equal to 0.22, a path of the electrolyte solution is ensured, and thus, the discharge utilization rate is improved. In addition, in Examples 4 and 5, there is a tendency that when M$_2$/M$_1$ is greater than or equal to 0.25, the discharge utilization rate is saturated. This is greatly different from the evaluation results of Comparative Examples 4 and 5. It is considered that this is because in the activated carbon black and the like, the amount of electrolyte solution absorption is large, and thus, the absorption unevenness occurs, and therefore, the discharge utilization rate extremely decreases from a certain amount of electrolyte solution. In a case where the activated carbon black and the like are used as the conductive agent, the mass ratio M$_2$/M$_1$ of mass M$_2$ of the non-aqueous electrolyte solution to the mass M$_1$ of the positive electrode pellet is adjusted to satisfy a relationship of $0.22 \leq M_2/M_1$, and thus, the discharge utilization rate can be improved.

The followings are found from the evaluation results of Examples 2, 6, 7, and 8 (the batteries using the carbon material in which the average value of I$_D$/I$_G$ is 1.3, in which the mass ratio between the PC and the DME that are the electrolyte solution is changed). That is, in the case of PC:DME=1:2 to 2:1 (Examples 2, 6, and 7), there is a tendency that the discharge utilization rate decreases, as the ratio of DME increases. On the other hand, in the case of PC:DME=2:1 to 3:1 (Examples 2 and 8), there is a tendency that the discharge utilization rate decreases, as the ratio of PC increases. Therefore, in order to maintain an excellent discharge utilization rate, it is preferable that the mass ratio of the PC to the DME is in a range of PC:DME=1:1 to 3:1, and it is particularly preferable that the mass ratio is approximately 2:1.

The followings are found from the evaluation results of Examples 2, 9, and 10 (the batteries using the carbon material in which the average value of I$_D$/I$_G$ is 1.3, in which the concentration of the electrolyte salt is changed in a range of 4 mass % to 10 mass %). That is, in a case where the concentration of the electrolyte salt is increased to 7 mass % from 4 mass %, the discharge utilization rate increases, and in a case where the concentration of the electrolyte salt is greater than 7 mass %, an increase in the discharge utilization rate slows and tends to be constant. Note that, it is considered that the low-temperature characteristics of the battery are degraded in accordance with an increase in the concentration of the electrolyte salt. Therefore, it is preferable that the concentration of the electrolyte salt is in a range of greater than or equal to 4 mass % and less than or equal to 10 mass %.

The followings are found from the evaluation results of Examples 2 and 11 to 13 (the batteries using the carbon material in which the average value of $I_D/I_G$ is 1.3, in which the mass ratio between the manganese dioxide and the carbon material that are contained in the positive electrode pellet is changed in a range of 90:10 to 97:3). That is, until the content of the carbon material with respect to the total amount of the manganese dioxide and the carbon material (hereinafter, simply referred to as the "content of the carbon material") is 4 mass %, the discharge utilization rate increases, as the carbon content increases, and in a case where the content of the carbon material is greater than 4 mass %, the discharge utilization rate tends to be approximately constant. However, in a case where the content of the carbon material is excessively increased, the content of the manganese dioxide decreases, and thus, the positive electrode capacity decreases. Therefore, it is preferable that the mass ratio of the manganese dioxide to the carbon material (manganese dioxide:carbon material) is in a range of 90:10 to 97:3, and it is particularly preferable that the mass ratio is approximately 96:4.

The followings are found from the evaluation result of Comparative Example 1 (the battery using the carbon material in which the average value of $I_D/I_G$ is 0.003, in which the conductive layer is not provided between the bottom portion of the positive electrode can and the positive electrode pellet). That is, in the battery in which the conductive layer is not provided between the bottom portion of the positive electrode can and the positive electrode pellet, in a case where $I_D/I_G$ is 0.003, a large voltage drop occurs at the moment of discharge, and it is not possible to perform the discharge.

The followings are found from the evaluation result of Comparative Example 2 (the battery using the carbon material in which the average value of $I_D/I_G$ is 0.003, in which the conductive layer is provided between the bottom portion of the positive electrode can and the positive electrode pellet). That is, in a case where the conductive layer is provided between the bottom portion of the positive electrode can and the positive electrode pellet, the discharge utilization rate is improved to 30%, and the discharge characteristics can be improved, compared to the battery of Comparative Example 1. However, in the case of assuming application to an actual device, it is considered that such improvement in the discharge characteristics is insufficient.

The followings are found from the evaluation result of Comparative Example 3 (the battery using the carbon material in which the average value of $I_D/I_G$ is 0.3). That is, even in the case of using the carbon material in which the average value of $I_D/I_G$ is 0.3, the discharge utilization rate is approximately identical to that of Comparative Example 2. As described above in Patent Document 2, this is because in the case of using graphite having a low graphitization degree, the passing route of the lithium ion is not sufficiently formed, and thus, even in the case of adjusting the average value of $I_D/I_G$, it is not possible to obtain an excellent discharge utilization rate.

The followings are found from the evaluation results of Comparative Examples 4 and 5 (the batteries using the carbon material in which the average value of $I_D/I_G$ is 0.003, in which the mass ratio $M_2/M_1$ of the mass $M_2$ of the non-aqueous electrolyte solution to the mass $M_1$ of the positive electrode pellet is changed to 0.252 and 0.333). That is, in a case where the carbon material in which the average value of $I_D/I_G$ is 0.003, that is, a graphite material is used as the carbon material, the discharge utilization rate is rarely changed even in the case of setting the mass ratio $M_2/M_1$ to be greater than or equal to 0.22.

<iii. Example in which Aluminum Foil is Pasted to Lithium Surface>

In a case where an aluminum foil is pasted to the surface of lithium (the negative electrode), and a fine powder layer formed of a lithium-aluminum alloy is formed, a Li elution reaction rate is improved. Therefore, a battery of Example 14 described below was produced, and closed circuit voltage (CCV) characteristics at the time of pulse discharge were evaluated.

Example 14

A battery was obtained as with Example 2, except that an aluminum foil was pasted to the surface of lithium, and a fine powder layer formed of a lithium-aluminum alloy was formed.

The CCV characteristics were evaluated at the time of the pulse discharge at 12 mA and 8 ms, in an environment of −40° C.

Table 3 shows the configurations of the batteries of Examples 2 and 14, and evaluation results.

TABLE 3

|  | Positive electrode | | Negative electrode | Presence | | | | |
|---|---|---|---|---|---|---|---|---|
|  | MnO$_2$:Carbon material (mass ratio) | Average value of $I_D/I_G$ of carbon material | Presence or absence of aluminum foil | or absence of conductive layer | Electrolyte solution | | | CCV at 40° C., 12 mA, and 8 ms [V] |
|  |  |  |  |  | PC:DME (mass ratio) | LiClO$_4$ (mass %) | Mass ratio $M_2/M_1$ |  |
| Example 2 | 95:5 | 1.3 | Absent | Present | 2:1 | 7 | 0.394 | 1.783 |
| Example 14 | 95:5 | 1.3 | Present | Present | 2:1 | 7 | 0.394 | 2.555 |

From the evaluation results described above, it is found that the aluminum foil is pasted to the surface of lithium, and the fine powder layer formed of the lithium-aluminum alloy is formed, and thus, it is possible to considerably improve the pulse characteristics at a low temperature. However, in a case where the lithium-aluminum alloy is formed, lithium is consumed by a reaction with respect to aluminum, and thus, there is a concern that the negative electrode capacity decreases. Therefore, in consideration of a balance between the negative electrode capacity and the pulse characteristics, it is preferable to adopt a configuration in which the aluminum foil is pasted to the surface of lithium, as necessary.

<iv. Examples in which Outer Diameter Ratio D2/D1 of Outer Diameter D2 of Positive Electrode Pellet to Outer Diameter D1 of Battery is Changed>

Examples 15 to 17

Batteries were obtained as with Example 2, except that the outer diameter $D_1$ of the battery and the outer diameter $D_2$ of the positive electrode pellet were changed such that the outer diameter ratio $D_2/D_1$ of the outer diameter $D_2$ of the positive electrode pellet when OCV was 3.2 V to the outer diameter $D_1$ of the battery was 0.74, 0.83, and 0.84.

The discharge utilization rate (%) was obtained as with "Evaluation of LPWA pulse discharge characteristics" described above.

Table 4 shows the configurations of the batteries of Examples 2 and 15 to 17, and evaluation results.

TABLE 4

| | Outer diameter $D_1$ of battery (mm) | Outer diameter $D_2$ of positive electrode pellet (mm) | $D_2/D_1$ | Discharge utilization rate (%) |
|---|---|---|---|---|
| Example 2 | 19.948 | 15.888 | 0.80 | 60.00 |
| Example 15 | 19.946 | 14.824 | 0.74 | 54.12 |
| Example 16 | 19.952 | 16.467 | 0.83 | 64.00 |
| Example 17 | 19.958 | 16.701 | 0.84 | 66.39 |

From the evaluation results described above, it is found that the discharge utilization rate tends to increase, in accordance with an increase in the outer diameter ratio $D_2/D_1$, and it is preferable that the outer diameter ratio $D_2/D_1$ is set to be in a range of $0.8 \leq D_2/D_1$ in order to set the discharge utilization rate to be greater than or equal to 60%. However, in the case of considering that the expansion of the positive electrode pellet at the time of discharge is hindered when the gap between the battery member and the positive electrode pellet is excessively small, it is preferable that the outer diameter ratio D2/D1 is $D2/D1 \leq 0.9$.

<v. Examples in which Area Ratio $S_1/S_2$ of Contact Area $S_1$ of Conductive Layer to Bottom Area $S_2$ of Positive Electrode Pellet is Changed>

Examples 18 to 20

A battery was obtained as with Example 17, except that a coating area of the conductive coating material to be applied onto the inner surface of the bottom portion of the positive electrode can was changed, that is, the area of the circular conductive layer to be provided on the inner surface of the bottom portion of the positive electrode can was changed.

The discharge utilization rate (%) was obtained as with "Evaluation of LPWA pulse discharge characteristics" described above.

Table 5 shows the configurations of the batteries of Examples 17 to 20, and evaluation results.

TABLE 5

| | Outer diameter of positive electrode pellet (mm) | Outer diameter of conductive layer (mm) | $S_1/S_2$ | Discharge utilization rate (%) |
|---|---|---|---|---|
| Example 17 | 16.701 | 17.00 | 1.00 | 66.39 |
| Example 18 | 16.701 | 15.10 | 0.82 | 63.20 |
| Example 19 | 16.701 | 14.22 | 0.72 | 60.20 |
| Example 20 | 16.701 | 0.00 | 0.00 | 48.03 |

$S_1$: Area in which conductive layer is in contact with bottom portion of positive electrode pellet
$S_2$: Bottom area of positive electrode pellet It should be understood that, in Example 17, the conductive coating material is applied to be larger than the outer diameter of the positive electrode pellet, and thus, the area ratio $S_1/S_2$ of the area $S_1$ in which the conductive layer is in contact with the bottom portion of the positive electrode pellet to the bottom area $S_2$ of the positive electrode pellet is "1". In addition, in a case where the coating area of the conductive coating material was smaller than the bottom area $S_2$ of the positive electrode pellet, it was considered that the area $S_1$ in which the conductive layer was in contact with the bottom portion of the positive electrode pellet was identical to the area of the conductive layer.

From the evaluation result described above, it is found that the discharge utilization rate tends to be improved in accordance with an increase in the area ratio $S_1/S_2$, it is preferable that the area ratio $S_1/S_2$ is set to be greater than or equal to 0.72 in order to obtain the discharge utilization rate of greater than or equal to 60%.

As described above, the embodiment of the present disclosure and the modification examples thereof, and the examples have been described in detail, but the present disclosure is not limited to the embodiment and the modification example thereof, and the examples described above, and various modifications based on the technical idea of the present disclosure can be made.

For example, the configurations, the methods, the steps, the shapes, the materials, the numerical values, and the like described in the embodiment of the present disclosure and the modification examples thereof, and the examples described above are merely an example, and configurations, methods, steps, shapes, materials, numerical values, and the like different from those described above may be used as necessary. In addition, the chemical formulas of the compound and the like are representative, and are not limited to the described valences and the like in the case of the generic term of the same compound.

In addition, the configurations, the methods, the steps, the shapes, the materials, the numerical values, and the like described in the embodiment of the present disclosure and the modification examples thereof, and the examples described above can be combined with each other unless departing from the gist of the present disclosure.

In addition, the present disclosure is further described in an embodiment of the present disclosure.

(1)

A non-aqueous electrolyte solution battery, including:

a positive electrode containing manganese dioxide and a carbon material;

a negative electrode containing one of lithium and a lithium alloy;

a non-aqueous electrolyte solution; and a container containing the positive electrode, the negative electrode, and the non-aqueous electrolyte solution, in which in a spectrum that is measured by performing Raman spectroscopic analysis with respect to the positive electrode by using argon laser at a wavelength of 514.5 nm, an average value of peak intensity ratios $I_D/I_G$ of an intensity $I_D$ of a peak appearing in the vicinity of 1330 cm$^{-1}$ to an intensity $I_G$ of a peak appearing in the vicinity of 1580 cm$^{-1}$ satisfies a relationship of $0.5 \leq I_D/I_G \leq 1.3$, and a mass ratio $M_2/M_1$ of a mass $M_1$ of the positive electrode to a mass $M_2$ of the non-aqueous electrolyte solution satisfies a relationship of $0.22 \leq M_2/M_1$.

(2)

The non-aqueous electrolyte solution battery according to (1), in which the container includes a positive electrode can, the non-aqueous electrolyte solution battery further includes a conductive layer provided between a bottom portion of the positive electrode can and the positive electrode, and an area ratio $S_1/S_2$ of an area $S_1$ in which the conductive layer is in contact with a bottom surface of the positive electrode to a bottom area $S_2$ of the positive electrode satisfies a relationship of $0.72 \leq S_1/S_2$.

(3)

The non-aqueous electrolyte solution battery according to one of (1) and (2), in which an outer diameter ratio $D_2/D_1$ of an outer diameter $D_2$ of the positive electrode when an open circuit voltage is 3.2 V to an outer diameter $D_1$ of the battery satisfies a relationship of $0.8 \leq D_2/D_1$.

(4)

The non-aqueous electrolyte solution battery according to any one of (1) to (3), in which a mass ratio of the manganese dioxide to the carbon material (the manganese dioxide:the carbon material) is 90:10 to 97:3.

(5)

The non-aqueous electrolyte solution battery according to any one of (1) to (4), in which the manganese dioxide contains $\beta\text{-MnO}_2$.

(6)

The non-aqueous electrolyte solution battery according to any one of (1) to (5), in which the positive electrode further contains a binding agent, and the binding agent contains at least a fluorine-based resin.

(7)

The non-aqueous electrolyte solution battery according to (6), in which the fluorine-based resin contains at least one type of polytetrafluoroethylene and polyvinylidene fluoride.

(8)

The non-aqueous electrolyte solution battery according to one of (6) and (7), in which a content of the fluorine-based resin in the positive electrode is greater than or equal to 1.4 mass % and less than 10 mass %.

(9)

The non-aqueous electrolyte solution battery according to any one of (1) to (8), in which the negative electrode includes a facing surface that faces the positive electrode, and the non-aqueous electrolyte solution battery further includes a powder that is provided on the facing surface and contains a lithium aluminum alloy.

(10)

The non-aqueous electrolyte solution battery according to any one of (1) to (9), in which the non-aqueous electrolyte solution contains cyclic carbonate and an ether compound.

(11)

The non-aqueous electrolyte solution battery according to (10), in which the cyclic carbonate contains propylene carbonate, and the ether compound contains 1,2-dimethoxy ethane.

(12)

The non-aqueous electrolyte solution battery according to (11), in which a mass ratio of the propylene carbonate to the 1,2-dimethoxy ethane (the propylene carbonate:the 1,2-dimethoxy ethane) is 1:1 to 3:1.

(13)

The non-aqueous electrolyte solution battery according to any one of (1) to (12), in which the non-aqueous electrolyte solution contains lithium perchlorate, and a content of the lithium perchlorate in the non-aqueous electrolyte solution is greater than or equal to 4 mass % and less than or equal to 10 mass %.

(14)

The non-aqueous electrolyte solution battery according to any one of (1) to (13), further including:

a ring member containing the positive electrode, in which the container includes a positive electrode can, and the ring member is welded to a bottom portion of the positive electrode can.

(15)

The non-aqueous electrolyte solution battery according to (14), further including:

a conductive layer provided between the bottom portion of the positive electrode can and the positive electrode, in which a peripheral edge of the conductive layer is positioned in one of a position between the bottom portion of the positive electrode can and the ring member and a position outside the ring member.

(16)

The non-aqueous electrolyte solution battery according to any one of (1) to (15), further including:

a separator, in which the separator is one of a porous film and a non-woven fabric.

(17)

The non-aqueous electrolyte solution battery according to any one of (1) to (16), in which the carbon material includes activated carbon black.

(18)

The non-aqueous electrolyte solution battery according to any one of (1) to (16), in which the carbon material includes activated carbon black and natural graphite.

(19)

A communication device, including:

the non-aqueous electrolyte solution battery according to any one of (1) to (18), in which the communication device receives power supply from the non-aqueous electrolyte solution battery.

(20)

The communication device according to (19), further including an LPWA type communication unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A non-aqueous electrolyte solution battery, comprising:
    a positive electrode including manganese dioxide and a carbon material;
    a negative electrode including one of lithium and a lithium alloy;
    a non-aqueous electrolyte solution; and
    a container including a positive electrode can configured to accommodate the positive electrode, the negative electrode, and the non-aqueous electrolyte solution,
    wherein in a spectrum that is measured by performing Raman spectroscopic analysis with respect to the positive electrode by using argon laser at a wavelength of 514.5 nm, an average value of peak intensity ratios $I_D/I_G$ of an intensity $I_D$ of a peak appearing in the vicinity of 1330 cm' to an intensity $I_G$ of a peak appearing in the vicinity of 1580 cm' satisfies a relationship of $0.5 \leq I_D/I_G \leq 1.3$, and
    a mass ratio $M_2/M_1$ of a mass $M_1$ of the positive electrode to a mass $M_2$ of the non-aqueous electrolyte solution satisfies a relationship of $0.22 \leq M_2/M_1 \leq 0.40$, wherein
    the non-aqueous electrolyte solution battery further includes a conductive layer provided between a bottom portion of the positive electrode can and the positive electrode, and a bottom portion of the positive electrode is provided on the conductive layer;
    an area ratio $S_1/S_2$ satisfies a relationship of $0.72 \leq S_1/S_2 \leq 1.00$, wherein $S_1$ is a contact area where the conductive layer is in contact with the positive electrode, and an area $S_2$ is an area of the bottom portion of the positive electrode;
    the non-aqueous electrolyte solution includes cyclic carbonate including propylene carbonate and an ether compound including 1,2-dimethoxy ethane, wherein a mass ratio of the propylene carbonate to the 1,2-dimethoxy ethane is from 1:1 to 3:1, and
    a content of a lithium perchlorate in the non-aqueous electrolyte solution is from 4 mass % to 10 mass %.

2. The non-aqueous electrolyte solution battery according to claim 1,
    wherein an outer diameter ratio $D_2/D_1$ of an outer diameter $D_2$ of the positive electrode when an open circuit voltage is 3.2 V to an outer diameter $D_1$ of the battery satisfies a relationship of $0.8 \leq D_2/D_1 \leq 0.9$.

3. The non-aqueous electrolyte solution battery according to claim 1,
    wherein a mass ratio of the manganese dioxide to the carbon material is from 90:10 to 97:3.

4. The non-aqueous electrolyte solution battery according to claim 1,
    wherein the manganese dioxide includes $\beta$-$MnO_2$.

5. The non-aqueous electrolyte solution battery according to claim 1,
    wherein the positive electrode further includes a binding agent, and
    the binding agent includes at least a fluorine-based resin.

6. The non-aqueous electrolyte solution battery according to claim 5,
    wherein the fluorine-based resin includes at least one type of polytetrafluoroethylene and polyvinylidene fluoride.

7. The non-aqueous electrolyte solution battery according to claim 5,
    wherein a content of the fluorine-based resin in the positive electrode is greater than or equal to 1.4 mass % and less than 10 mass %.

8. The non-aqueous electrolyte solution battery according to claim 1,
    wherein the negative electrode includes a facing surface that faces the positive electrode, and
    the non-aqueous electrolyte solution battery further includes a powder that is provided on the facing surface and the powder includes a lithium aluminum alloy.

9. The non-aqueous electrolyte solution battery according to claim 1, further comprising:
    a ring member including the positive electrode,
    wherein the container includes a positive electrode can, and
    the ring member is welded to a bottom portion of the positive electrode can.

10. The non-aqueous electrolyte solution battery according to claim 9, further comprising:
    a conductive layer provided between the bottom portion of the positive electrode can and the positive electrode,
    wherein a peripheral edge of the conductive layer is positioned in a position between the bottom portion of the positive electrode can and the ring member or a position outside the ring member.

11. The non-aqueous electrolyte solution battery according to claim 1,
    wherein the carbon material includes activated carbon black.

12. The non-aqueous electrolyte solution battery according to claim 1,
    wherein the carbon material includes activated carbon black and natural graphite.

13. The non-aqueous electrolyte solution battery according to claim 1, wherein the conductive layer has a substantially planar shape and is in contact with and extends along at least a portion of the bottom portion of the positive electrode.

14. The non-aqueous electrolyte solution battery according to claim 1, further comprising:
    a separator,
    wherein the separator includes one of a porous film and a non-woven fabric.

15. A communication device, comprising:
    the non-aqueous electrolyte solution battery according to claim 1,
    wherein the communication device is configured to receive power supply from the non-aqueous electrolyte solution battery.

16. The communication device according to claim 15, further comprising an LPWA type communication unit.

* * * * *